United States Patent
Mielenz et al.

(10) Patent No.: US 10,698,084 B2
(45) Date of Patent: Jun. 30, 2020

(54) METHOD AND SYSTEM FOR CARRYING OUT A CALIBRATION OF A SENSOR

(71) Applicant: Robert Bosch GmbH, Stuttgart (DE)

(72) Inventors: Holger Mielenz, Ostfildern (DE); Daniel Zaum, Sarstedt (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 16/007,726

(22) Filed: Jun. 13, 2018

(65) Prior Publication Data

US 2018/0364328 A1 Dec. 20, 2018

(30) Foreign Application Priority Data

Jun. 16, 2017 (DE) .......................... 10 2017 210 112

(51) Int. Cl.
*G01S 7/40* (2006.01)
*G01S 15/93* (2020.01)
(Continued)

(52) U.S. Cl.
CPC ................ *G01S 7/40* (2013.01); *G01C 25/00* (2013.01); *G01S 7/4026* (2013.01); *G01S 7/415* (2013.01);
(Continued)

(58) Field of Classification Search
CPC ........ G01C 21/00; G01C 21/26; G01C 25/00; G01S 7/00; G01S 7/40; G01S 7/539;
(Continued)

(56) References Cited

U.S. PATENT DOCUMENTS 7,124,027 B1 * 10/2006 Ernst, Jr. ............... G01S 13/931
   701/301
8,001,860 B1 * 8/2011 Preston .................. B60W 40/11
   73/866.5
(Continued)

FOREIGN PATENT DOCUMENTS

DE   102010042821 A1   4/2012
DE   102015009869 A1   3/2016
(Continued)

*Primary Examiner* — Yonel Beaulieu
(74) *Attorney, Agent, or Firm* — Norton Rose Fulbright US LLP; Gerard Messina

(57) ABSTRACT

A method/system for calibrating a vehicle sensor, including detecting data about the vehicle's surroundings using the sensor, and ascertaining stationary structures using the detected first data pieces. Stationary structures are selected for later calibration, and potential parking positions are determined. A parking position is selected from the potential parking positions so that after parking, stationary structures selected for a calibration of the sensor are in the sensor's field of vision. The vehicle is parked, and the position of the stationary structures selected for the calibration of the sensor is stored. After the vehicle start, second data pieces about the vehicle's surroundings are detected using the sensor, and instantaneous positions of the selected stationary structures are ascertained using the detected second data pieces. The instantaneous position are compared with the stored positions, and deviations between the instantaneous positions and the stored positions determined. The sensor is calibrated using the determined deviations.

11 Claims, 2 Drawing Sheets

(51) Int. Cl.

| | | |
|---|---|---|
| *G01S 13/93* | (2020.01) | |
| *G08G 1/00* | (2006.01) | |
| *G08G 1/14* | (2006.01) | |
| *G08G 1/16* | (2006.01) | |
| *G01C 25/00* | (2006.01) | |
| *G01C 21/26* | (2006.01) | |
| *G01S 7/497* | (2006.01) | |
| *G01S 7/52* | (2006.01) | |
| *G01S 7/41* | (2006.01) | |
| *G01S 7/539* | (2006.01) | |
| *G01S 13/931* | (2020.01) | |
| *G01S 15/931* | (2020.01) | |
| *G01S 7/48* | (2006.01) | |
| *G01S 17/931* | (2020.01) | |

(52) U.S. Cl.
CPC ............ *G01S 7/4802* (2013.01); *G01S 7/497* (2013.01); *G01S 7/52004* (2013.01); *G01S 7/539* (2013.01); *G01S 13/931* (2013.01); *G01S 15/931* (2013.01); *G01S 17/931* (2020.01); *G01S 2007/4091* (2013.01); *G01S 2013/9314* (2013.01); *G01S 2015/932* (2013.01)

(58) Field of Classification Search
CPC ........ G01S 17/00; G01S 17/931; G01S 13/00; G01S 15/00; G01S 15/931
See application file for complete search history.

(56) References Cited

U.S. PATENT DOCUMENTS

| | | | | |
|---|---|---|---|---|
| 8,768,620 | B2* | 7/2014 | Miller | G01C 21/16 |
| | | | | 701/500 |
| 9,802,624 | B2* | 10/2017 | Thor | B60W 10/20 |
| 10,067,897 | B1* | 9/2018 | Lesher | G01B 7/003 |
| 10,109,198 | B2* | 10/2018 | Qiu | G08G 1/164 |
| 2015/0032401 | A1* | 1/2015 | Nordbruch | G01D 18/00 |
| | | | | 702/104 |
| 2015/0153376 | A1* | 6/2015 | Preston | B60W 40/11 |
| | | | | 702/141 |
| 2015/0276923 | A1* | 10/2015 | Song | G01S 15/931 |
| | | | | 702/97 |
| 2016/0364985 | A1* | 12/2016 | Penna | G01C 21/3685 |
| 2018/0261095 | A1* | 9/2018 | Qiu | G08G 1/164 |
| 2018/0374351 | A1* | 12/2018 | Penna | G08G 1/096811 |
| 2019/0293756 | A1* | 9/2019 | Blaes | G01S 7/4972 |
| 2020/0081134 | A1* | 3/2020 | Wheeler | G01S 19/52 |

FOREIGN PATENT DOCUMENTS

| | | |
|---|---|---|
| DE | 102015205087 A1 | 9/2016 |
| DE | 102015220360 A1 | 4/2017 |
| EP | 2793045 A1 | 10/2014 |
| WO | 2012052308 A1 | 4/2012 |

* cited by examiner

METHOD AND SYSTEM FOR CARRYING OUT A CALIBRATION OF A SENSOR

RELATED APPLICATION INFORMATION

The present application claims priority to and the benefit of German patent application no. 10 2017 210 112.1, which was filed in Germany on Jun. 16, 2017, the disclosure which is incorporated herein by reference.

FIELD OF THE INVENTION

The present invention relates to a method for carrying out a calibration of a sensor of a vehicle. A further aspect of the present invention relates to a system for carrying out a sensor calibration, which includes at least one sensor, a control unit and a memory, the system being configured to carry out the method.

BACKGROUND INFORMATION

Modern vehicles include a variety of sensors, via which information about the surroundings of the vehicle may be obtained. In order to guarantee a safe operation of the vehicle systems, which rely on obtained data, it must be ensured that the sensors of the vehicle are correctly calibrated.

A method for checking a surroundings detection system of a vehicle is discussed in EP 2 793 045 A1. Objects are detected with a first surroundings sensor type and are categorized as static and dynamic objects. In addition, the position of the detected static objects relative to the vehicle is determined. This position is subsequently compared to a relative position ascertained using a second surroundings sensor type. The method also takes an egomotion of the vehicle into account, so that it is not necessary for the sensor of the first surroundings sensor type to detect the object at the same time as the sensor of the second surroundings sensor type.

A method for the self-localization of a vehicle is discussed in DE 10 2015 009 869 A1. In this method, successive images are detected and an instantaneous position of the vehicle is ascertained based on positions deposited and assigned to the images. For this purpose, image features that are suitable for a self-localization, for example, a roadway marking or a manhole cover, are extracted in the images. The images may be detected, for example, with a stereo camera.

A method is discussed in WO 2012/052308 A1, with which the base width of a stereo detection system may be determined. In this system it is provided to detect an object in the vehicle surroundings and to determine a dimension of the object and the distance to the vehicle via the stereo detection system. The ascertained dimension is compared with a reference dimension of the object determined at a reference distance. Suitable for the comparison are, in particular, objects having standardized dimensions, such as traffic signs and license plates having a known height.

The disadvantage of methods in the related art is that a calibration of a sensor requires either an additional sensor system independent of the sensor or that the systems are reliant on the presence of standardized and known markers.

SUMMARY OF THE INVENTION

A method for carrying out a calibration of a sensor of a vehicle is provided. In a first step a) of the method, it is provided to detect first pieces of data about the surroundings of the vehicle using the sensor. Subsequently, stationary structures and potential parking positions are ascertained in a second step b) using the detected first pieces of data, positions of the stationary structures also being ascertained. In a subsequent step c), stationary structures are selected for a later calibration of the sensor. In addition, a selection is made in a step d) of the potential parking positions, a selected parking position being selected in such a way that after a vehicle is parked in the selected parking position, stationary structures selected for a calibration of the sensor are located in a field of vision of the sensor. In a subsequent step e), the vehicle is parked in the selected parking position and the positions of the stationary structures selected for a calibration of the sensor are stored. The parked vehicle is stopped in the parking position. Once a continuation of travel is intended, the vehicle is started according to a step f) of the method. In a subsequent step g), second pieces of data about the surroundings of the vehicle are detected using the sensor and in a following step h) of the method, instantaneous positions of the selected stationary structures are ascertained using the detected second pieces of data. A step i) follows in which the instantaneous positions are compared with the stored positions and deviations between the instantaneous positions and the stored positions are determined. Finally, the sensor is calibrated using the determined deviations.

The method may be applied to a single sensor, since no data from additional sensors are required for a calibration of this sensor. However, the method is equally applicable for use with multiple sensors, where the sensors may be of similar or varying type. When applied to multiple sensors, it is provided, in particular, that steps a) through c) and g) through j) are carried out separately for each sensor and independently of additional sensors, whereby, in deviation thereof, a synopsis of data of all sensors involved may be resorted to for determining potential parking positions according to step b). In addition, it may be in this case that when selecting the potential parking position according to step d), all sensors are jointly taken into account, so that at the selected parking positions, selected stationary structures are located in the respective fields of vision of all sensors.

The sensor calibrated with the aid of the method may, for example, be a stereo camera, a video camera, a radar sensor, a LIDAR sensor or an ultrasonic sensor. In addition, multiple of such sensors as well as combinations of multiple of the cited sensors may also be calibrated with the method.

Objects, which are classified as stationary objects and movable objects, may be recognized in the first pieces of data when ascertaining stationary structures according to step b). A stationary structure in this case is a stationary object or a part of a stationary object.

To recognize objects in first pieces of data, algorithms matched to the sensor type used and known, in principle, to those skilled in the art may be used. Image processing algorithms may be used, for example, in the case of stereo cameras or video cameras. Algorithms, which identify objects based on their characteristic shape, may be employed when using LIDAR sensors and, in the case of radar sensors or ultrasonic sensors, a classification may take place using recognized sizes of the objects and distances of the objects. Methods that are matched to the respective sensor type may be employed, which carry out an object classification on the basis of contour information. The contour may be directly determined depending on sensor type or it may be determined from the sensor data via evaluation methods. Alternatively or in addition, machine learning techniques may be employed in order to recognize and classify the objects in the raw sensor data. A library of known objects may be provided for recognizing the objects, it being provided in each case whether it is a stationary object or a movable object.

Examples of objects or parts of an object that are classified as stationary, are houses, traffic signs, curbsides, walls, posts, trees, ceiling columns, drain gutters, drain gratings, floors, walls, slabs, lamp housings, lights, windows, doors and additional building openings. Examples of objects that are classified as movable objects are vehicles, children's vehicles, persons, animals, vegetation, leaf piles and garbage cans.

A stationary structure may be identical to a recognized object or may be a part of an object. The entire object may be selected as a stationary structure, in particular in the case of relatively small objects, which may be detected as a whole by the sensor. This is the case, in particular, for objects, such as traffic signs. In the case of relatively large objects, which cannot be detected as a whole by the sensor at one time such as, for example, a house, characteristic parts, such as edges or windows, are selected as stationary structures. Additional examples of characteristic parts of an object are differences of texture in floors, walls and ceilings and contour information of windows, doors and additional building openings.

The sensor to be calibrated has a field of vision within which the sensor may recognize objects. The field of vision may be described, for example, via a horizontal aperture angle and a vertical aperture angle, at the same time, a maximum distance limiting the field of vision in the case of certain sensor types, such as ultrasonic sensors and radar sensors.

Selection criteria may be taken into account when selecting stationary structures according to step c). The selection criteria are selected, for example, based on an accuracy of the ascertained position of the respective stationary structure, on the recognition potential of the stationary structure under fluctuating boundary conditions, on the position of a stationary structure relative to additional stationary structures, and on combinations of at least two of these criteria.

Examples of fluctuating boundary conditions are, for example, the weather conditions and lighting conditions. Stationary structures that are easy to recognize both at night and by daylight may be used, for example. Stationary objects, which sway in the wind, such as trees and posts, for example, may pose problems.

The more accurately the position of a stationary structure may be ascertained, the more suitable the stationary structure is for a later calibration of the sensor and the sooner this structure will be taken into account in the selection.

For calibrating various sensors such as, for example, stereo cameras, it is advantageous if multiple stationary structures are situated relative to one another in such a way that a calibration of the sensor is possible with respect to two axes orthogonal relative to one another. This means, it is advantageous if at least three structures are located relative to one another in such a way that these structures are not situated on a shared line.

When selecting the selected parking positions according to step d), the potential parking positions may be rated, the potential parking position with the best rating being selected. In this case, it may be provided that the more of the selected stationary structures that are located within the field of vision of the sensors, the better a potential parking position is rated if the vehicle were to be parked in this potential parking position. In other words, the number of selected stationary structures visible to the sensor from the potential parking position may be maximized.

When rating potential parking positions, selected stationary structures that may be obstructed by movable objects, as viewed from the potential parking position, are rated worse than stationary objects that may not be obstructed by movable objects, as viewed from the potential parking position. For this purpose, it may be provided, in particular, to analyze whether an additional potential parking position lies between the potential parking position just checked and the corresponding stationary structure. If this is the case, the view of the sensor on this stationary structure could be blocked by a vehicle parked in this additional potential parking position. The corresponding stationary structure would then not be available for a later calibration of the sensor, so that this stationary structure is rated worse.

It may be provided that the vehicle is configured to execute a driving maneuver in an automated manner, in particular, both a lateral guidance, i.e., the steering of the vehicle, as well as a longitudinal guidance, i.e. the acceleration and deceleration of the vehicle, being carried out automatically. It may then be provided in conjunction with the method that the vehicle automatically approaches the selected parking position for parking according to step e).

In step e) it is further provided to store the positions of the selected stationary structures. For this purpose, it is provided, in particular, to store the position of the respective stationary structure relative to the vehicle. For this purpose, the position of the respective stationary structure, if necessary, is to be redetermined using the sensor after reaching the selected parking position or is to be calculated with the aid of a known egomotion of the vehicle.

The vehicle remains for a long period of time in the selected parking position until a continuation of travel is intended. After the start of the vehicle for the continuation of travel, the remaining steps g) through j) are carried out. The continuation of travel may then take place with the calibrated sensor.

Another aspect of the present invention is to provide a system for carrying out a sensor calibration. The system includes at least one sensor, a control unit and a memory. Under this aspect, it is provided that the system is configured and configured to carry out one of the methods described herein.

Since the system is configured for carrying out the described method, features described in conjunction with the method apply accordingly to the system and, vice versa, the features described in conjunction with the system apply correspondingly to the method.

The at least one sensor of the system in this case is calibrated using the described method.

The at least one sensor is, for example, a stereo camera, a video camera, a radar sensor, a LIDAR sensor, an ultrasonic sensor or a combination of at least two of these sensors.

The method provided and the system provided enable a simple sensor recalibration once a vehicle has been parked, so that decalibrations of sensors caused, in particular, as a result of temperature fluctuations while the vehicle was stationary may be compensated for.

The method provided for calibrating a sensor advantageously requires no sensors independent from the sensor to be calibrated. In addition, no knowledge is required about particular markers that are standard or have been previously measured using other arrangements.

Stationary structures, which are suitable for a later calibration, are advantageously recognized in the surroundings of the vehicle before heading for a final stopping position, and the final stopping position is selected in such a way that from this stopping position numerous suitable stationary structures may be present, i.e., are located in the field of vision of the sensor to be calibrated. In this case, the positions of these selected stationary structures are stored so that they are available when restarting the vehicle.

In an exemplary embodiment variants of the method, the parking position selected as the final stopping position is approached automatically, so that the vehicle comes to a stop at precisely the optimal stopping position.

In addition, it is advantageously provided, when determining the selected parking position, to take into account possibilities that the selected stationary structures are blocked from view. This reduces the probability that, for example, a view of the sensor to be calibrated on the selected stationary structures is blocked by additional parking vehicles.

An exemplary embodiment of the present invention is depicted in the drawings and is described in greater detail in the description below.

DETAILED DESCRIPTION

Figure 1:
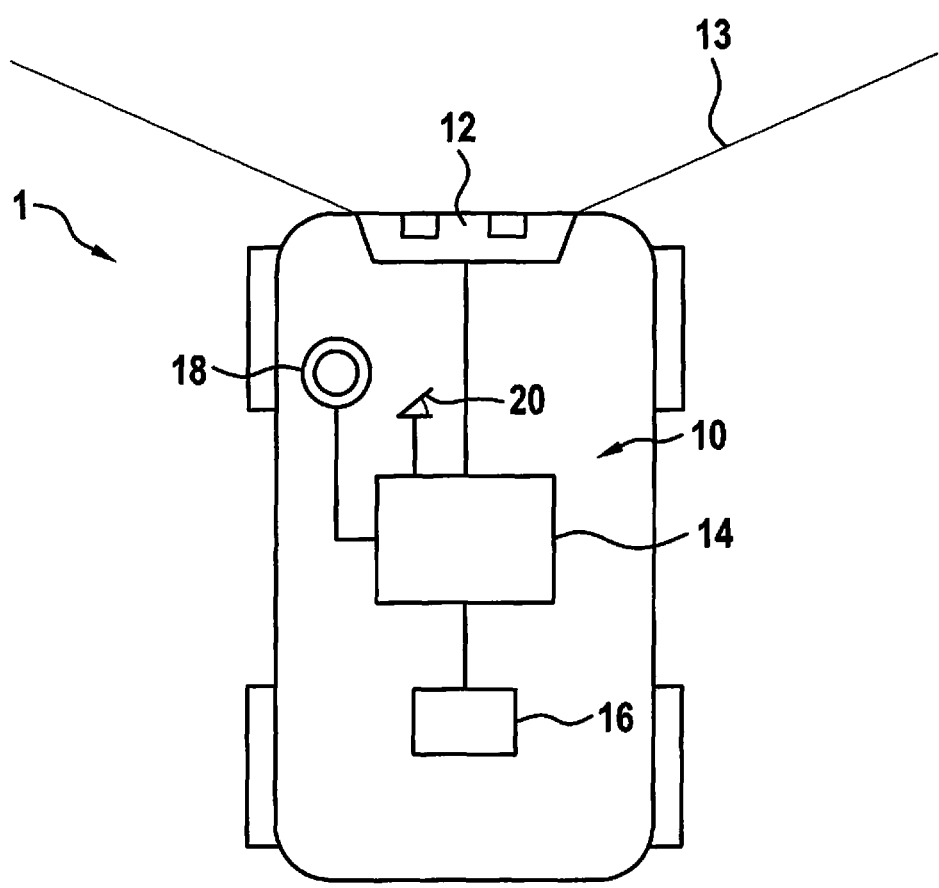
FIG. 1 schematically shows a depiction of a vehicle that includes the system according to the present invention.

In the following description of an exemplary embodiment of the present invention, identical components and elements are identified with the same reference numerals, a repeated description of these components or elements in individual cases being omitted. The figures depict only schematically the subject matter of the present invention.

FIG. 1 shows a vehicle 1, which includes a system 10 for carrying out a sensor calibration. System 10 includes a sensor 12, which is configured as a stereo camera in the exemplary embodiment depicted in FIG. 1. System 10 also includes a control unit 14, which is connected to sensor 12 as well as to a memory 16. In this arrangement, it may be provided that, in particular, control unit 14 and memory 16 are configured in the form of a single control unit.

Sensor 12 configured as a stereo camera has a field of vision 13, which is directed forward with respect to vehicle 1 in the exemplary embodiment depicted in FIG. 1.

To enable an automatic control of vehicle 1, control unit 14 has connections to additional components of vehicle 1. This is outlined in the schematic depiction in FIG. 1 via a connection to a steering wheel 18 and via a connection to a pedal 20.

Figure 2:
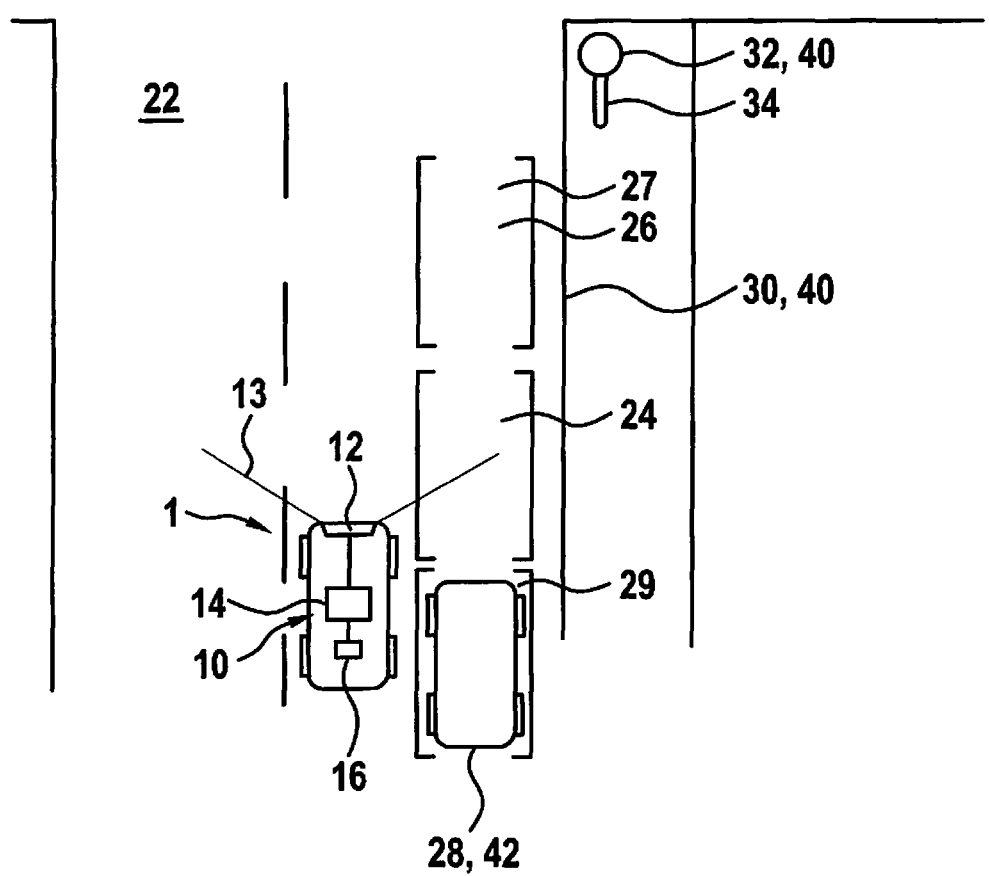
FIG. 2 shows the selection of a parking position for parking a vehicle.

FIG. 2 shows a vehicle 1, which is equipped with a system 10 according to the present invention that includes a sensor 12. Vehicle 1 is located on a road 22 and is to be parked. A first potential parking position 24 and as well as a second potential parking position 26 are located on the right edge of road 22. A parking vehicle 28 is already stopped in additional parking position 29, so that this additional parking position 29 is not available.

Located in the surroundings of vehicle 1 are various objects 40, 42, which are in field of vision 13 of sensor 12 and may therefore be detected by sensor 12. Objects 40, 42 may be classified as stationary objects 40 and movable objects 42. Stationary objects 40 are immovable and may therefore not alter their position. Stationary objects 40 are normally permanently attached to the ground.

Movable objects 42 on the other hand are, in principle, able to alter their position, even if they may be intermittently at rest. An example of a movable object 42 is parking vehicle 28, which is located in additional parking position 29.

Examples of stationary objects 40 are a curbside 30, a traffic sign 32 as well as a house 36 located in the field of vision of sensor 12.

If vehicle 1 is parked in one of the potential parking positions 24, 26 for a longer period of time, there is the possibility of sensor 12 becoming decalibrated, caused, for example, by temperature fluctuations. Thus, for a calibration of sensor 12 to be carried out when restarting the vehicle, it is desirable if a high number of stationary structures is located in field of vision 13 of sensor 12, the positions of which are known to system 10 of vehicle 1. This makes it possible namely to calibrate sensor 12 on the basis of recognized deviations in a position of these known stationary structures determined with sensor 12 after the restart.

In order to ensure the presence of a high number of such stationary structures before parking, it is provided according to the present invention that first pieces of data about the surroundings of vehicle 1 are detected using sensor 12. These first pieces of data detected with sensor 12 contain information about objects 40, 42, which are located in field of vision 13 of sensor 12. It is subsequently provided to ascertain stationary structures, which represent either a stationary object 40 or a part of a stationary object 40. For this purpose, a classification of objects 40, 42 detected via sensor 12 as stationary objects 40 and movable objects 42 is initially carried out. In the present example of FIG. 2, curbside 30, traffic sign 32 as well as house 36 are recognized as stationary objects 40. Stationary structures are then determined, which in the present example include an edge 38 of house 36, a post 34 of traffic sign 32 as well as curbside 30. All these stationary structures are suitable for a calibration and are therefore selected.

In addition, it is advantageously provided to identify the potential parking positions 24, 26 in the surroundings of vehicle 1 with the aid of the detected first pieces of data.

The parking position, from which on the one hand, many stationary structures may be visible for sensor 12, i.e., are located in field of vision 13 of sensor 12, is then selected from the potential parking positions 24, 26. On the other hand, this selection may take into account whether the view of sensor 12 of the corresponding stationary structure may be blocked.

If in the example in FIG. 2 the first potential parking position 24 were selected, then curbside 30, traffic sign 32 as well as house 36 would be visible to sensor 12 from first potential parking position 24. A view of sensor 12 on traffic sign 32 as well as on house 36 might be blocked, however, if after parking vehicle 1 in first potential parking position 24, an additional vehicle were to be parked in second potential parking position 26. Therefore, when selecting, second potential parking position 26 is rated higher and is accordingly determined as selected parking position 27. Vehicle 1 then heads for selected parking position 27 in an automated manner and information, which includes, in particular, the positions of the stationary structures, is stored in memory 16 of system 10. Vehicle 1 is stopped after it reaches selected parking position 27.

After a restart of vehicle 1, sensor 12 detects second pieces of data about the surroundings of vehicle 1 and the positions of the previously selected structures in the second pieces of data are determined. This is followed by a comparison between the positions of the stationary structures stored in memory 16 and the instantaneous positions of the stationary structures ascertained from the second pieces of data. Since the stationary structures are immovable, their position relative to vehicle 1 cannot have been altered. Any deviations in the positions must therefore be attributable to a decalibration of sensor 12. Thus, it is finally provided to perform a calibration of sensor 12 with the aid of the recognized deviations. Vehicle 1 may then continue its travel.

The present invention is not limited to the exemplary embodiments described herein and to the aspects highlighted therein. Rather, a plurality of modifications is possible within the scope specified by the claims, which fall within the routine practice of those skilled in the art.

What is claimed is:

1. A method for carrying out a calibration of a sensor of a vehicle, the method comprising:
   a) detecting first pieces of data about the surroundings of the vehicle using the sensor;
   b) ascertaining stationary structures and potential parking positions using the first pieces of detected data, positions of the stationary structures being ascertained;
   c) selecting stationary structures for a later calibration of the sensor;
   d) selecting from the potential parking positions, a selected parking position being selected so that after a parking of the vehicle in the selected parking position, stationary structures selected for a calibration of the sensor are located in the field of vision of the sensor;
   e) parking the vehicle in the selected parking position and storing the positions of the stationary structures selected for a calibration of the sensor;
   f) starting the vehicle;
   g) detecting second pieces of data about the surroundings of the vehicle using the sensor;
   h) ascertaining instantaneous positions of the selected stationary structures using the detected second pieces of data;
   i) comparing the instantaneous positions of the selected stationary structures with the stored positions of the selected stationary structures, deviations between the instantaneous positions of the selected stationary structures and the stored positions of the selected stationary structures being determined; and
   j) calibrating the sensor using the determined deviations.

2. The method of claim 1, wherein when ascertaining stationary structures according to task b), objects are recognized in the first pieces of data and are classified as stationary objects and movable objects, a stationary structure being a stationary object or a part of a stationary object.

3. The method of claim 2, wherein houses traffic signs, curbsides, walls, posts, trees, ceiling columns, drain gutters, drain gratings, floors, walls, slabs, lamp housings, lights, windows, doors and additional building openings detected in the first pieces of data are classified as stationary objects.

4. The method of claim 2, wherein vehicles, children's vehicles, persons, animals, vegetation, leaf piles and garbage cans detected in the first pieces of data are classified as movable objects.

5. The method of claim 1, wherein when selecting stationary structures according to task c), selection criteria are taken into account, which are selected based on an accuracy of the ascertained position of the respective stationary structure, on the recognition potential of the stationary structure under fluctuating boundary conditions, on the position of a stationary structure relative to additional stationary structures, and on combinations of at least two of these criteria.

6. The method of claim 1, wherein when selecting the selected parking position according to task (d), the potential parking positions are rated, the potential parking position with the best rating being selected.

7. The method pf claim 6, wherein the more of the selected stationary structures that are located within the field of vision of the sensor as viewed from the respective potential parking position, the better a potential parking position is rated.

8. The method of claim 6, wherein when rating a potential parking position, selected stationary structures, which may be blocked by movable objects as viewed from the potential parking position, are rated worse than selected stationary structures, which may not be blocked by movable objects as viewed from the potential parking position.

9. The method of claim 1, wherein for parking according to task e), the vehicle automatically heads for the selected parking position.

10. A system for carrying out a calibration of a sensor of a vehicle, comprising:
    a system arrangement including:
       at least one sensor;
       a control unit; and
       a memory;
    wherein the system arrangement is configured for carrying out the calibration of the sensor, by performing the following:
       a) detecting first pieces of data about the surroundings of the vehicle using the sensor;
       b) ascertaining stationary structures and potential parking positions using the first pieces of detected data, positions of the stationary structures being ascertained;
       c) selecting stationary structures for a later calibration of the sensor;
       d) selecting from the potential parking positions, a selected parking position being selected so that after a parking of the vehicle in the selected parking position, stationary structures selected for a calibration of the sensor are located in the field of vision of the sensor;
       e) parking the vehicle in the selected parking position and storing the positions of the stationary structures selected for a calibration of the sensor;
       f) starting the vehicle;
       g) detecting second pieces of data about the surroundings of the vehicle using the sensor;
       h) ascertaining instantaneous positions of the selected stationary structures using the detected second pieces of data;
       i) comparing the instantaneous positions of the selected stationary structures with the stored positions of the selected stationary structures, deviations between the instantaneous positions of the selected stationary structures and the stored positions of the selected stationary structures being determined; and
       j) calibrating the sensor using the determined deviations.

11. The system of claim 10, wherein the at least one sensor is a stereo camera, a video camera, a radar sensor, a LIDAR sensor, an ultrasonic sensor, or a combination of at least two of these sensors.

* * * * *